(12) United States Patent
Trompen et al.

(10) Patent No.: US 9,179,645 B2
(45) Date of Patent: Nov. 10, 2015

(54) DISPENSER

(75) Inventors: Mick A. Trompen, Westfield, IN (US);
Gregory A. Lyon, Indianapolis, IN (US);
Jeffery A. Meyer, Greenfield, IN (US);
Joseph R. Winkle, Carmel, IN (US)

(73) Assignees: Aircom Manufacturing, Inc.,
Indianapolis, IN (US); Eli Lilly and Company, Indianapolis, IN (US)

( * ) Notice: Subject to any disclaimer, the term of this patent is extended or adjusted under 35 U.S.C. 154(b) by 1544 days.

(21) Appl. No.: 11/685,927

(22) Filed: Mar. 14, 2007

(65) Prior Publication Data

US 2007/0257129 A1 Nov. 8, 2007

Related U.S. Application Data

(63) Continuation-in-part of application No. 11/226,478, filed on Sep. 14, 2005, now Pat. No. 7,954,457.

(51) Int. Cl.
*A01K 13/00* (2006.01)
*A01K 11/00* (2006.01)
*A01K 27/00* (2006.01)

(52) U.S. Cl.
CPC ............ *A01K 13/003* (2013.01); *A01K 11/001* (2013.01); *A01K 27/007* (2013.01)

(58) Field of Classification Search
CPC .. A01K 13/003; A01K 11/001; A01K 27/007
USPC .................. 119/602, 603, 652, 660–662, 860
See application file for complete search history.

(56) References Cited

U.S. PATENT DOCUMENTS

| | | |
|---|---|---|
| 3,465,724 A | 9/1969 | Broadbent |
| 3,541,995 A | 11/1970 | Fathauer |
| 3,756,200 A | 9/1973 | Ohlhausen |
| 3,781,837 A | 12/1973 | Anderson et al. |
| 3,840,009 A | 10/1974 | Michaels et al. |
| 3,893,111 A | 7/1975 | Cotter |
| 3,902,084 A | 8/1975 | May |

(Continued)

FOREIGN PATENT DOCUMENTS

| | | |
|---|---|---|
| EP | 0 140 558 | 8/1985 |
| JP | 5065879 | 3/1993 |

(Continued)

OTHER PUBLICATIONS

Taylor, M.A., Recent Developments in Ectoparasiticides, The Veterinary Journal, vol. 161, No. 3, May 2001, pp. 253-268.

(Continued)

*Primary Examiner* — Valentina Xavier
(74) *Attorney, Agent, or Firm* — Bose McKinney & Evans LLP

(57) ABSTRACT

A dispenser that delivers a small but consistent and sustained amount of liquid over an extended period of time, particularly useful but not limited to dispensing pesticides when worn by cattle. The dispenser has a shell having an opening. A reservoir is disposed in the shell and holds a pesticide or other liquid. A wick is in fluid communication with the reservoir. An end of the wick is positioned adjacent the opening and has a greater capillary attraction or wicking ability than the reservoir, whereby during use of the dispenser the wick draws fluid from the reservoir and deposits it on the animal upon contact.

51 Claims, 11 Drawing Sheets

(56) References Cited

U.S. PATENT DOCUMENTS

| | | |
|---|---|---|
| 3,929,277 A | 12/1975 | Byrne et al. |
| 3,935,839 A | 2/1976 | Goodwin |
| 3,941,283 A | 3/1976 | Garbe |
| 3,949,708 A | 4/1976 | Meeks |
| 4,023,532 A | 5/1977 | Goodwin |
| 4,184,453 A | 1/1980 | Ritchey |
| 4,225,578 A | 9/1980 | von Bittera et al. |
| 4,286,005 A | 8/1981 | Berger |
| 4,354,889 A | 10/1982 | Berger |
| 4,359,015 A | 11/1982 | Ritchey |
| 4,366,777 A | 1/1983 | Akhavein et al. |
| 4,381,782 A | 5/1983 | Mazurak et al. |
| 4,399,821 A | 8/1983 | Bowers |
| 4,425,117 A | 1/1984 | Hugemann et al. |
| 4,425,874 A | 1/1984 | Child |
| 4,428,327 A | 1/1984 | Steckel |
| 4,495,898 A | 1/1985 | Akhavein et al. |
| 4,506,630 A | 3/1985 | Hair |
| RE31,940 E | 7/1985 | Ritchey |
| 4,532,530 A | 7/1985 | Hawkins |
| 4,532,892 A | 8/1985 | Kuzara |
| 4,543,247 A | 9/1985 | von Bittera et al. |
| 4,544,547 A | 10/1985 | Von Bittera et al. |
| 4,562,794 A | 1/1986 | Spekcman |
| 4,579,085 A | 4/1986 | McGuire |
| 4,596,575 A | 6/1986 | Rosenberg et al. |
| 4,606,478 A | 8/1986 | Hack et al. |
| 4,612,877 A | 9/1986 | Hayes |
| 4,617,876 A | 10/1986 | Hayes |
| 4,674,445 A | 6/1987 | Cannelongo |
| 4,694,781 A | 9/1987 | Howe et al. |
| 4,697,549 A | 10/1987 | Hair |
| 4,718,374 A | 1/1988 | Hayes |
| 4,721,064 A | 1/1988 | Denk et al. |
| 4,750,284 A | 6/1988 | Parry et al. |
| 4,854,328 A | 8/1989 | Pollack |
| 4,865,044 A | 9/1989 | Wallace et al. |
| 4,890,580 A | 1/1990 | Owen et al. |
| 4,930,451 A | 6/1990 | Miller et al. |
| 4,944,659 A | 7/1990 | Labbe et al. |
| 5,044,114 A | 9/1991 | Haberer |
| 5,046,453 A | 9/1991 | Vinci |
| 5,074,252 A | 12/1991 | Morgan, Jr. |
| 5,167,625 A | 12/1992 | Jacobsen et al. |
| 5,190,220 A | 3/1993 | Bolton |
| 5,318,557 A | 6/1994 | Gross |
| 5,429,606 A | 7/1995 | Robinson et al. |
| 5,582,593 A | 12/1996 | Hultman |
| 5,618,269 A | 4/1997 | Jacobsen et al. |
| 5,620,696 A | 4/1997 | Krzewki et al. |
| 5,750,514 A | 5/1998 | Meyer |
| 5,823,989 A | 10/1998 | Ostrow |
| 5,894,841 A | 4/1999 | Voges |
| 5,932,204 A | 8/1999 | Joshi |
| 5,980,496 A | 11/1999 | Jacobsen et al. |
| 6,056,734 A | 5/2000 | Jacobsen et al. |
| 6,109,539 A | 8/2000 | Joshi et al. |
| 6,113,539 A | 9/2000 | Ridenour |
| 6,283,065 B1 | 9/2001 | Shorrock et al. |
| 6,293,474 B1 | 9/2001 | Helf et al. |
| 6,296,196 B1 | 10/2001 | Denen et al. |
| 6,339,897 B1 | 1/2002 | Hayes et al. |
| 6,341,732 B1 | 1/2002 | Martin et al. |
| 6,367,925 B1 | 4/2002 | Chen et al. |
| 6,375,649 B1 | 4/2002 | Jellie |
| 6,378,780 B1 | 4/2002 | Martens, III et al. |
| 6,382,522 B2 | 5/2002 | Tomkins et al. |
| 6,386,462 B1 | 5/2002 | Martens, III et al. |
| 6,419,163 B1 | 7/2002 | Joshi et al. |
| 6,436,069 B1 | 8/2002 | Jellie |
| 6,439,474 B2 | 8/2002 | Dengen |
| 6,446,880 B1 | 9/2002 | Schram et al. |
| 6,450,419 B1 | 9/2002 | Martens, III et al. |
| 6,482,863 B2 | 11/2002 | Munagavalasa et al. |
| 6,543,389 B2 | 4/2003 | Hedde |
| 6,588,376 B1 | 7/2003 | Groh |
| 6,632,041 B1 * | 10/2003 | Witz et al. .................. 401/199 |
| 6,664,897 B2 | 12/2003 | Pape et al. |
| 6,668,760 B2 | 12/2003 | Groh et al. |
| 6,669,682 B1 | 12/2003 | Gibson et al. |
| 6,758,000 B2 | 7/2004 | Sandt et al. |
| 6,786,427 B2 | 9/2004 | Schram et al. |
| 6,789,741 B2 | 9/2004 | Varanasi et al. |
| 6,793,149 B2 | 9/2004 | Schram et al. |
| 6,800,070 B2 | 10/2004 | Mazidji et al. |
| 6,835,386 B2 | 12/2004 | Gutierrez |
| 6,843,430 B2 | 1/2005 | Boticki et al. |
| 6,857,580 B2 | 2/2005 | Walter et al. |
| 6,879,693 B2 | 4/2005 | Miller et al. |
| 6,923,383 B1 | 8/2005 | Joshi et al. |
| 6,962,579 B2 | 11/2005 | Jellie |
| 2001/0020317 A1 | 9/2001 | Heisig et al. |
| 2001/0050317 A1 | 12/2001 | Denen |
| 2002/0087120 A1 | 7/2002 | Rogers et al. |
| 2002/0088154 A1 | 7/2002 | Sandt et al. |
| 2002/0158156 A1 | 10/2002 | Joshi et al. |
| 2002/0192255 A1 | 12/2002 | Schiavo et al. |
| 2003/0062001 A1 | 4/2003 | Anderson |
| 2003/0212386 A1 | 11/2003 | Trompen et al. |
| 2004/0161282 A1 | 8/2004 | Bolton |
| 2004/0199116 A1 | 10/2004 | Trompen et al. |
| 2005/0025979 A1 | 2/2005 | Sandt et al. |
| 2005/0145187 A1 | 7/2005 | Gray |
| 2006/0037557 A1 | 2/2006 | Gordon |

FOREIGN PATENT DOCUMENTS

| | | |
|---|---|---|
| WO | WO 88/05314 | 7/1988 |
| WO | WO 98 01023 | 1/1998 |
| WO | WO 02/16048 | 2/2002 |
| WO | WO 03/028797 | 4/2003 |
| WO | WO 2004 066720 | 8/2004 |
| WO | WO 2004 089238 | 10/2004 |

OTHER PUBLICATIONS

Pipano, E., Israel Journal of Veterinary Medicine, vol. 58, No. 2/3, 2003, pp. 39-45.

Bhushan, C., Evaluation of the Efficacy of Flumethrin (Bayticol®) Pour-On Against Cattle Ticks in India Under Field Conditions, The Indian Veterinary Journal, vol. 76, No. 2, Feb. 1999, pp. 94-96.

Rothwell, J.T., Efficacy of zeta-cypermethrin as pour-on or spray formulations for the control of buffalo fly (*Haematobia irritans exigua*) in cattle, Australian Veterinary Journal, vol. 76, No. 9, Sep. 1998, pp. 610-612.

Dharmaraj, Benzene Hexachloride Toxicity in a Buffalo Calf—A Case Report, The Indian Veterinary Journal, vol. 81, No. 2, Feb. 2004, pp. 86-87.

Molento, M.B., Persistent efficacy of doramectin pour-on against artificially induced infections of nematodes in cattle, Veterinary Parasitology, vol. 82, No. 4, May 1999, pp. 297-303.

Taylor, M.A., Treatment and Control of Ectoparasites of Cattle, Cattle Practice, vol. 5, Part 4, BCVA 1997, pp. 279-282.

Uzijka, Y., Chemical Control of *Haematobia* irritans with 0.5% Topical Ivermectin Solution in Cattle, The Journal of Veterinary Medicine Science, vol. 61, No. 3, Mar. 1999, pp. 287-289.

Filtrona Fibertec Website printout—Cellulose Acetate Reservoirs, (printed May 9, 2006)—1 page, http://www.filtronafibertec.com/BondedFiberComponents/3b56fa77-7f03-4aed-bcb5-c98a91ce33a6.htm.

* cited by examiner

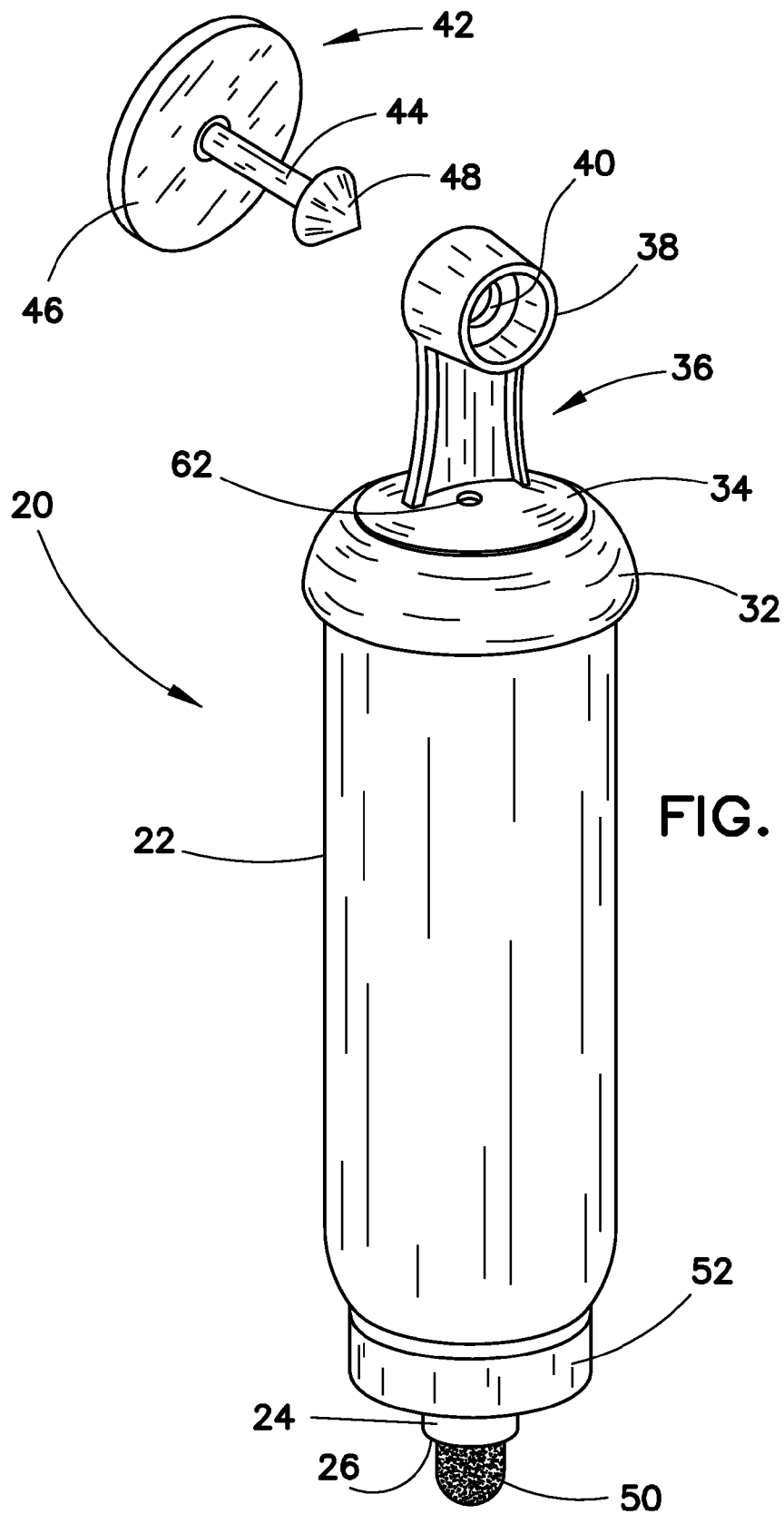

DISPENSER

RELATED APPLICATIONS

This application is a continuation-in-part from U.S. application Ser. No. 11/226,478 filed on Sep. 14, 2005, now U.S. Pat. No. 7,954,457 the entire disclosure of which is incorporated by reference.

FIELD OF THE INVENTION

The present invention relates to fluid delivery and more particularly to a dispenser for delivering fluid over extended periods of time.

BACKGROUND

There are various methods used to control pests on large domestic animals such as livestock. Commonly employed methods include sprays and dusts, back rubbers and dust bags, and ear tags or tapes.

Sprays, dusts, and pour-on applications of pesticide involve manually applying pesticide to the animal's back. Although this method can be effective, it requires additional herding and handling and is generally not practical for large ranches or for free-range cattle.

Back rubbers and dust bags are devices that are impregnated or filled with pesticide and suspended in a pasture in proximity to a salt lick, water supply or place the animals frequent. The animals make contact with these devices in the normal course of their routine. The dust bag or back rubber may also be located in a gateway which leads to a salt lick or water supply and which forces the animal to contact the device. Again, this method of insecticide application can be effective, but may not be practical for certain situations such as large ranches or free-range cattle.

Ear tags are widely used and are generally made of a molded polymer matrix impregnated (i.e., saturated or immersed) with a substance such as a pesticide or parasiticide. These ear tags or tapes are attached to animals by piercing the ear with a sharp post and corresponding locking receptacle or with adhesive. The pesticide slowly leaches from the carrier material and is deposited onto the animal. The animal then spreads the material by moving its head from side to side and by rubbing alongside other animals.

The delivery of substance from these known ear tags is problematic. Among other delivery problems, the tags release the substance after packaging such that it crystallizes on the surface of the tag itself, thereby exposing the user to a high concentration of the pesticide. Another significant problem is that the output of the tags is not constant. Initially, they supply excessive doses of the substance, but over time, their output falls below an effective or lethal level, where it remains. The tags then supply doses that are less than lethal for weeks or perhaps months before their nominal expiration date. Unfortunately, exposing parasites to a sub-lethal dose causes future generations of these pests to develop a resistance or immunity to the substance. In turn, for a given area in which the tags are used, the type of tags used must be frequently changed so that the pests are exposed to a new substance to which they have not developed a resistance. This can create excess inventory of tags that are no longer effective, and can undesirably result in tags that have only been worn by the animals a short time before having to be replaced. The labor and costs associated with "re-tagging" animals mid-season can be quite large.

Moreover, the types of substances which can be used to saturate known ear tags is generally limited due to solubility and/or compatibility between the saturating substance and the polymer matrix. For example, compounds like ivermectin and spinosad have relatively high molecular weights and poor solubility in polymers such as polyethylene. These compounds are essentially incompatible with conventional ear tags.

Another problem with known ear tags is the inherent limit in the amount of liquid pesticide that can be saturated into a given size polymer matrix. It is not practical to produce a device large enough to contain sufficient insecticide to kill pests for an entire season. The size of the device would be such that it interferes with the animal's normal routine and would likely cause discomfort or injury to the animal, such as eye irritation, drooping ears, tears in the ear at the location of attachment, etc.

It would be desirable to have an application method and dispenser that is capable of dosing a repeatable, prolonged, and lethal application of pesticide to an animal with no gradual decline, but rather, a sudden and complete cessation of exposure, and does not require further herding, handling or contact with the animal.

SUMMARY OF THE INVENTION

The present invention provides a dispenser that delivers a small but consistent, controlled, and sustained dose of fluid over an extended period of time.

In one form thereof, the present invention provides a dispenser. The dispenser comprises a shell having an opening. An attachment member is provided for attaching the dispenser to an animal. A reservoir is disposed in the shell and contains a substantially nonvolatile liquid. The reservoir is made from a material that retains the liquid by capillary forces. A wick is in fluid communication with the reservoir and has a first end positioned adjacent the opening. The wick has a greater capillary attraction than the reservoir.

In exemplary forms of the dispenser, various methods may be used to provide the wick with a greater capillary attraction or wicking ability than the reservoir. For example, the wick may be made of a material having a greater density than the material from which the reservoir is formed. Also, depending upon the hydrophilicity of the substance being dispensed, a wick that is more hydrophilic than the reservoir may result in a greater capillary attraction for the wick. A wick having a smaller pore size than the reservoir may also result in the wick having a greater capillary attraction than the reservoir. In certain embodiments, the wick and the reservoir have the same material composition, but the shell comprises a sleeve that exerts a compressive force on the wick to reduce its pore size and thus increase its capillary attraction.

In certain exemplary embodiments, the wick either protrudes from the opening, is substantially flush with or is recessed from the opening. More preferably, the shell comprises a sleeve which defines the opening, and the wick is disposed in the sleeve. A skirt extends from the shell, the skirt at least partially surrounding the sleeve.

In another form thereof, the present invention provides an inventive method of dispensing a substance in a controlled amount onto an animal. The method comprises providing a shell having an opening. A porous material reservoir is provided and is disposed in the shell. The reservoir holds a supply of liquid therein by capillary attraction. A wick is placed in fluid communication with the reservoir, and a portion of the wick is exposed from the opening. The exposed portion intermittently contacts the animal over a period of at least 120 days, which thereby gradually draws the liquid from the reservoir into the wick and deposits it from the wick onto the animal. In this method, the average amount of liquid dispensed per day is controlled, and it does not substantially decrease over the entire period.

In an exemplary form thereof, the wick has a greater capillary attraction than the reservoir, which promotes the wick drawing the substance from the reservoir and dispensing an amount of liquid per day that does not substantially decrease over the entire period. More preferably, the liquid substance is a pesticide and the dispenser may dispense a target amount of the pesticide for at least 120 days when attached to an animal that goes about normal activities such as grazing. The amount actually dispensed does not substantially differ from the target amount, even during the final portion of the dispensing period.

One advantage of the present invention is that the dose of substance being dispensed remains substantially constant as the supply is being consumed. That is, the amount of liquid being dispensed per day does not drop off appreciably during the entire period that the dispenser is used. For example, if the dispenser is used to combat horn flies on cattle and the horn fly season is about 140 days, the dispenser will continue to dispense an amount that does not substantially differ from the target amount over the entire 140 day period. The amount of the dose dispensed with dispensers embodying the present invention is substantially independent of the volume of liquid contained in the dispenser, at least over the duration that the dispenser is used. This addresses the problems with known polymer tags that initially produce an extremely high dose which soon drops off to a sub-lethal dose that quickly allows pests to develop a resistance or immunity to the substance being dispensed. Since dispensers in accordance with the present invention can produce a consistently lethal dose over the entire period of interest, the chance of pests developing a tolerance to the substance is reduced, or at least takes much longer than with prior art polymer tags.

Another advantage of the present invention is that a small, lightweight dispenser may be filled with sufficient pesticide to last an entire season before being depleted. The costs and labor associated with mid season "re-tagging" are thus avoided with the present invention.

Yet another advantage of the present invention is that the dispensers can be handled and attached without contacting the substance contained therein. The only source of the pesticide (or whatever substance the dispenser may happen to contain) is the wick. However, in exemplary embodiments, the wick is either substantially flush with, recessed from, or protrudes slightly from the opening. Touching the wick when, e.g., attaching the device to an animal's ear therefore can easily be avoided.

Still another advantage of the present invention is that the shape of dispensers formed in accordance with preferred embodiments is ergonomic. That is, the animals generally appear able to tolerate wearing the dispensers for long periods of time without noticeable irritation and without the dispensers getting ensnared by, e.g., fences, other animals, or otherwise interfering with the animals' normal routine.

BRIEF DESCRIPTION OF THE DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein:

FIG. 1 is a perspective view of a dispenser in accordance with one embodiment of the present invention;

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1A:
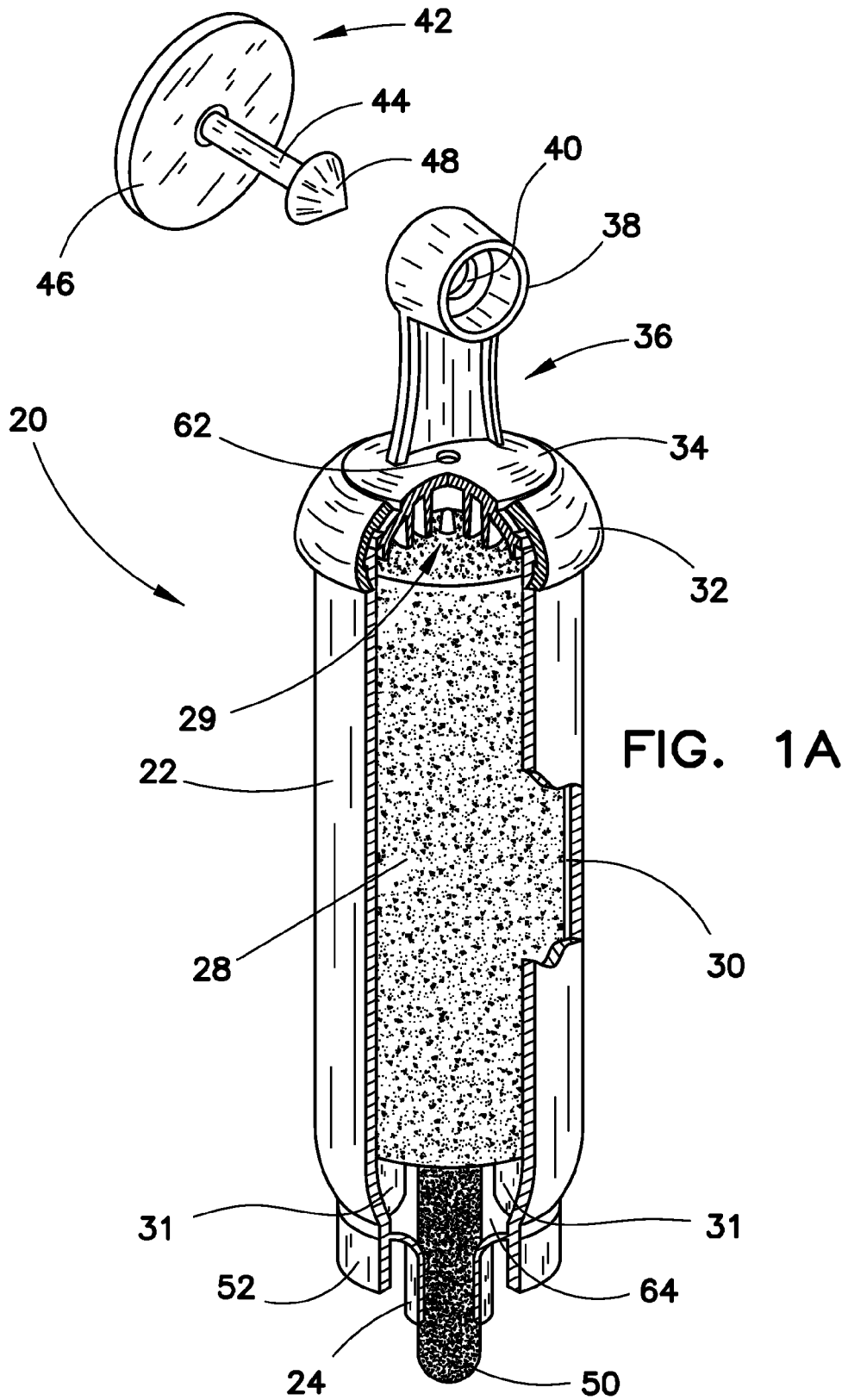
FIG. 1A is a perspective view of the dispenser shown in FIG. 1 with parts of the dispenser broken away to expose the interior of the dispenser.
Figure 1B:
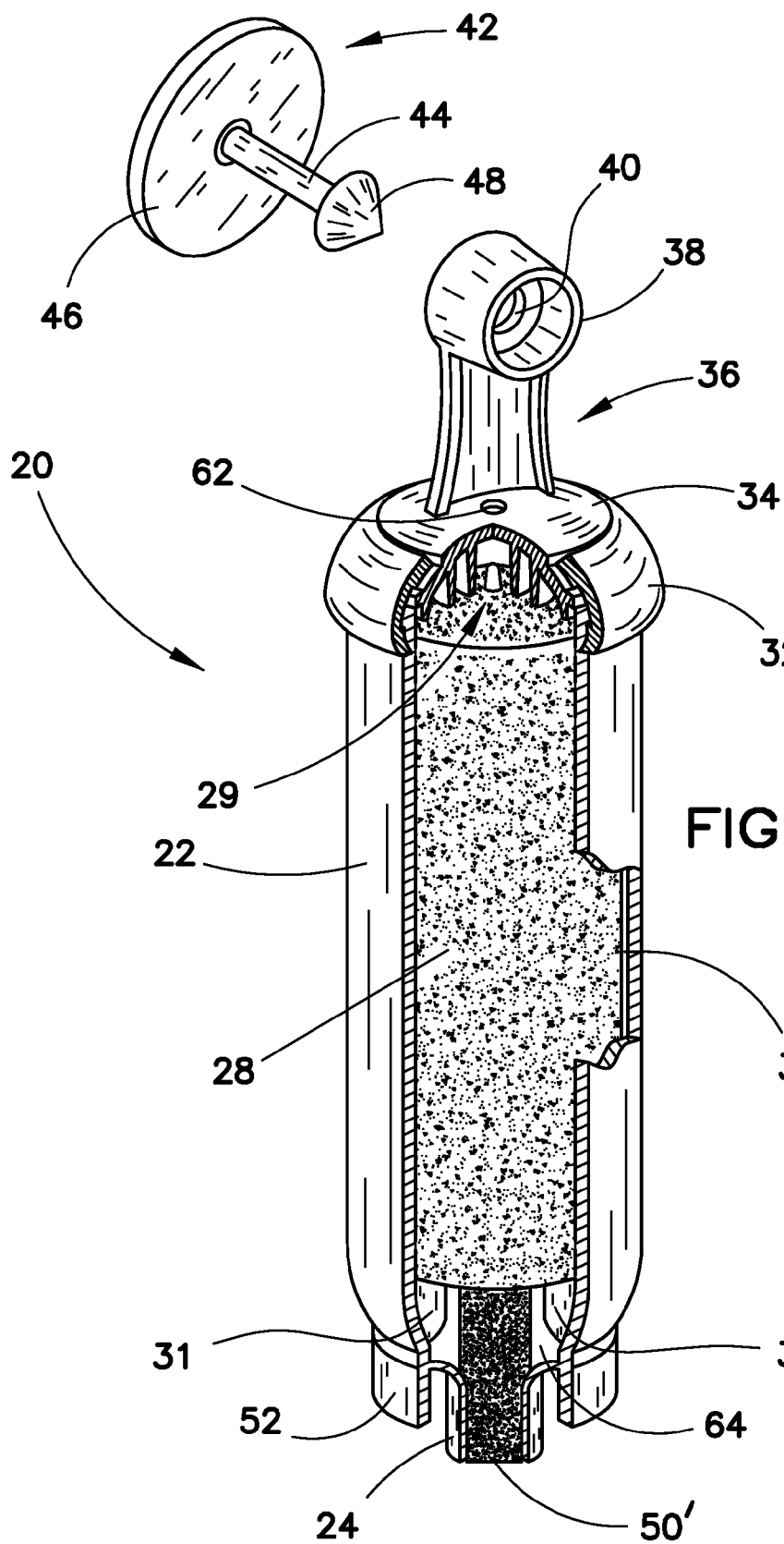
FIG. 1B shows a modification of the dispenser shown in FIG. 1A in which the wick is substantially flush with the opening of the dispenser.

Referring now to FIGS. 1 and 1A, dispenser 20 includes an outer shell 22 that defines a tip or sleeve 24 that terminates in an opening 26. Shell 22 in the illustrated embodiment is made of Formax 609, Acetal Copolymer from Chem Polymer Corporation, which is a fairly hard, lightweight material that is preferably formed by injection molding. One of skill in the art would readily recognize many suitable lightweight materials that could be used for shell 22, including various polymers, glass, hard rubber, wood, metal and the like. Disposed within shell 22 is reservoir 28 that is typically saturated with a pesticide that is held therein without substantial dripping by capillary action, as explained in more detail below. The material chosen for reservoir 28 can be any of a wide variety of materials know in the art, such as fibrous bundles, sponge material, porous plastics and the like. Materials suitable for reservoir 28 generally contain the liquid substance therein by capillary action without allowing the liquid to drip from the material. For purposes of this specification, the term "pesticide" is meant to include substances that kill one or more types of numerous small invertebrate animals such as horn flies, face flies, beetles, gnats, spiders, centipedes, arthropods and the like. Furthermore, while the illustrated embodiment is described with reference to a pesticide, one of skill in the art would readily recognize that many liquid substances could be employed with dispensers embodying the present invention, including but not limited to medicaments, growth hormones, therapeutic agents, drugs, pheromones, pesticides, insecticides, repellants, scents, and the like. It is preferable that the liquid substance be substantially nonvolatile. Since the wick is typically exposed, a volatile liquid substance used with dispensers embodied by the present invention would tend to evaporate, undesirably causing the dispenser to "dry out." A series of ribs 29 and 31 holds the reservoir in place in the shell. As shown in FIG. 1A, a gap 30 exists between the reservoir 28 and the interior surface of shell 22 to facilitate venting during use.

Figure 2:
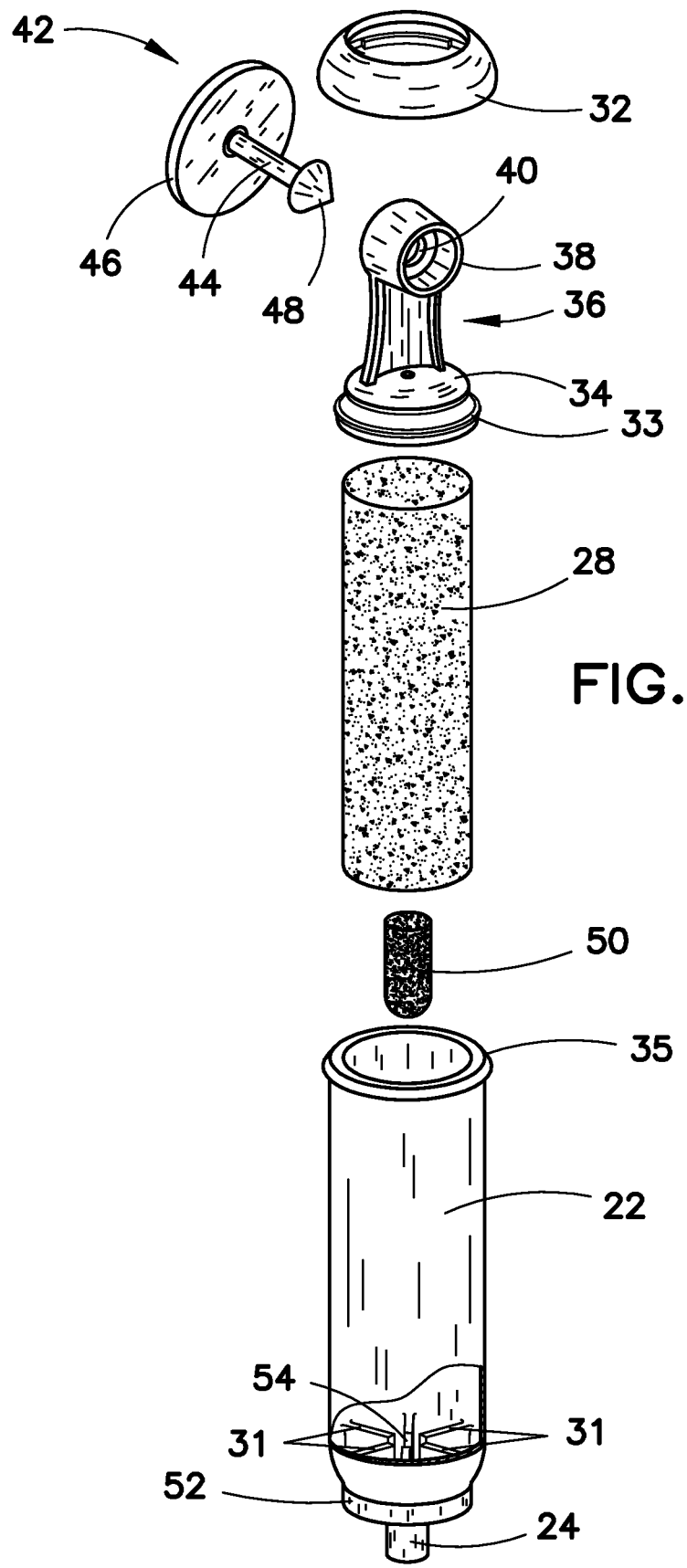
FIG. 2 is an exploded perspective view of the dispenser shown in FIG. 1.

Dispenser 20 includes a ring 32 that secures cap 34 to shell 22, as can be appreciated with reference to FIG. 2. Ring 32 has lips extending from its interior that interlock in a snap-fit engagement with lips 33 and 35 of cap 34 and shell 22, respectively. Integrally formed with cap 34 is attachment means or flexible grommet 36 that includes loop member 38 having a round hole 40 formed therein. The attachment mechanism is preferably formed of a flexible polymer such as a thermoplastic elastomer so that the dispenser can move as it hangs from the animal to which it is attached. One suitable polymer is Hytrel® 5526 from DuPont Engineering Polymers. Attachment member 42 includes a cylindrical post 44 extending from flange member 46 and has a conical locking member 48 disposed at its terminal end. In use, member 48 is pushed through hole 40, as described in more detail below. While one attachment means has just been described, one of skill in the art would readily recognize numerous other suitable attachment means, including tapes, adhesives, collars, harnesses, clamps, staples and many others.

A wick 50 is in fluid communication with reservoir 28. The wick 50 has one end in contact with reservoir 28 and the other end adjacent the opening 26. Fluid communication is established by having the wick 50 pressed against or abutting reservoir 28, in those embodiments in which the reservoir and wick are formed separately. In the illustrated embodiment, wick 50 has a greater "capillary attraction" or "wicking ability" than does reservoir 28, which means that wick 50 will tend to draw fluid from reservoir 28 by means of capillary action, as explained in greater detail below. A skirt 52 extends downwardly from shell 22 and protects wick 50, as explained below.

Figure 2A:
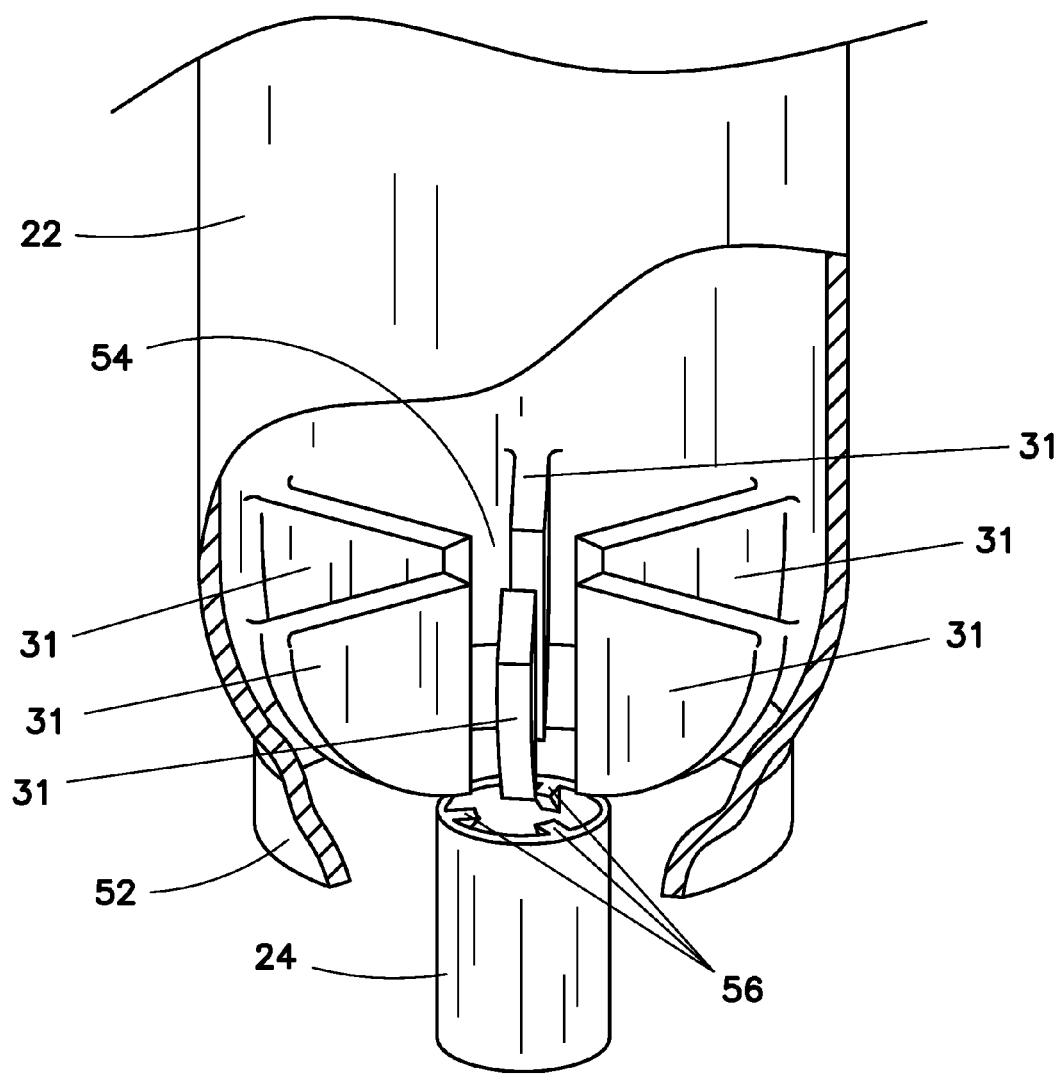
FIG. 2A is a fragmentary perspective view of the dispenser of FIG. 1 with parts broken away to show a rib structure in accordance with an embodiment of the present invention.

With reference to FIGS. 2 and 2A, it can be appreciated that ribs 31 are integrally formed with shell 22 and support the bottom of reservoir 28 and also define a cylindrical hollow space 54 through which wick 50 is received. Sleeve 24 includes nubs 56 that hold wick 50 in place in the sleeve and also hold it in place in an abutting relationship with reservoir 28 so that fluid transfer is facilitated. In certain embodiments, the nubs may hold the wick away from the sleeve and thereby provide a vent space for air to enter the dispenser as fluid is dispensed. In other embodiments, the nubs may be eliminated. Sleeve 24 may be elongated as shown in FIGS. 1, 2 and 2A, or in other embodiments may merely comprise an opening in shell 22 through which the wick is disposed. The sleeve may be employed to adjust the wicking properties of the wick, as explained in more detail below.

Figure 2B:
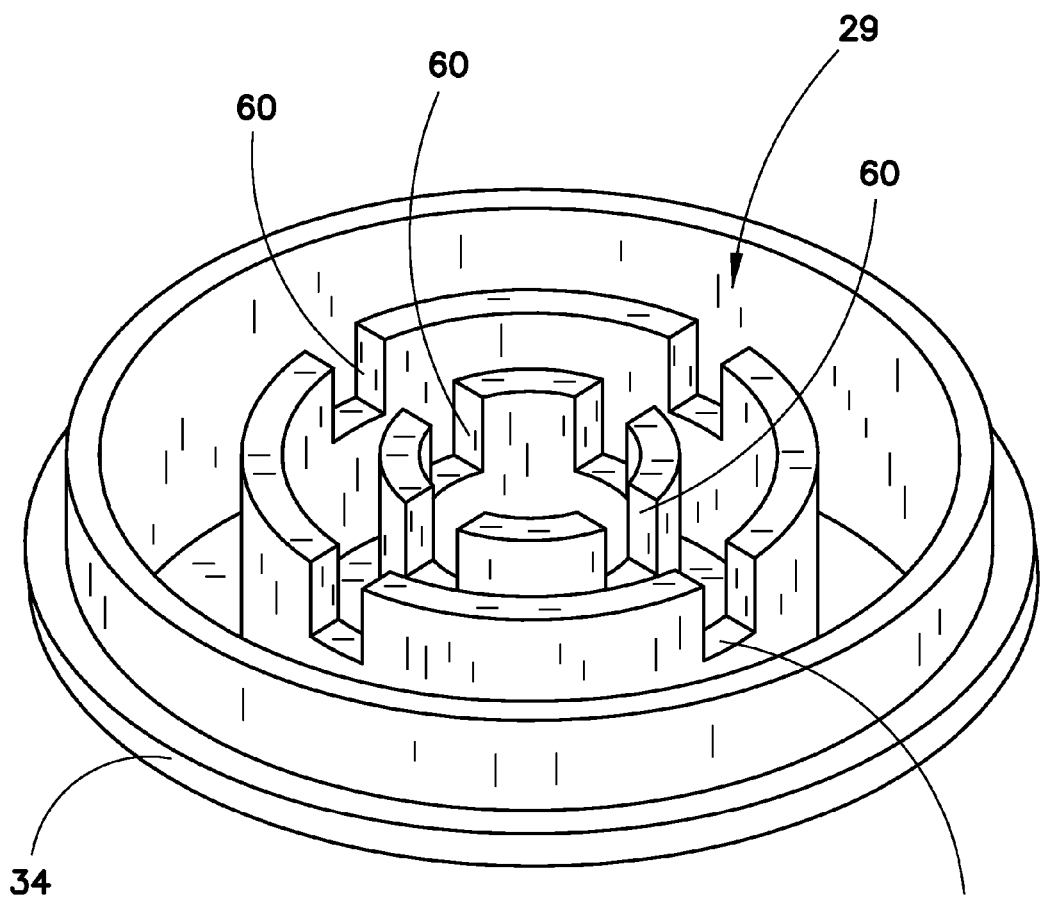
FIG. 2B is a perspective view of the underside of a cap of the dispenser shown in FIG. 1.

With reference to FIG. 2B, the bottom side of cap 34 includes circular ribs 29 extending therefrom. The ribs define aligned channels 60 for venting. As shown in FIG. 1, cap 34 includes a vent hole 62 formed therein which allows air to enter as fluid is dispensed from wick 52. The air enters through vent 62, and is able to reach gap 30 by means of channels 60. As shown, gap 30 continues along the length of reservoir 28 until it terminates at a void portion 64 that partially surrounds wick 50. Proper venting is necessary to prevent a vacuum effect that would counteract the capillary forces required for fluid payout.

Figure 3:
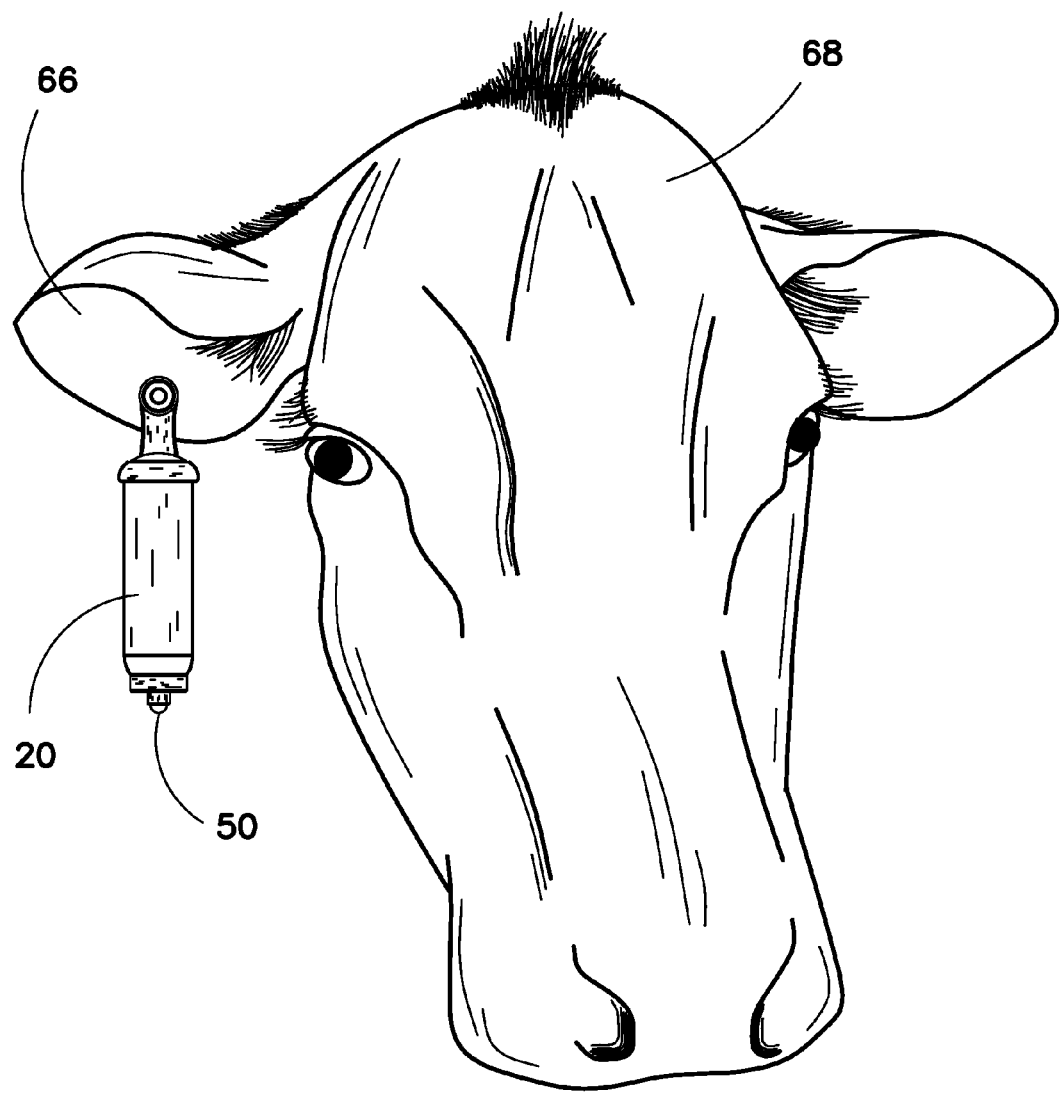
FIG. 3 is a perspective view of the dispenser of FIG. 1 attached to an animal.

With reference to FIGS. 1, 2 and 3, dispenser 20 is attached to the ear of animal 68, which in the illustrated embodiment is a cow. The dispenser is attached to the animal such that the wick is pointed downward and dispenser 20 is free to move as the animal's ear is moved or "flicked" and can thus contact the animal as the animal goes about its normal activities. Dispenser 20 attaches to the animal's ear by means of attachment member 42 and flexible grommet 36. The animal's ear is pierced and post 44 is pushed through the hole produced by piercing and is then fed into hole 40. It has been found that post 44 of attachment member 42 is sized sufficiently long so as to avoid squeezing the animal's ear between flange member 46 and loop member 40. Instead, the ear fits comfortably between flange member 46 and loop member 40. It has been found that this method of attachment allows dispenser 20 to be worn by a cow for several months without the cow's ear becoming irritated, even though dispenser 20 when full weighs about 30 grams or more, as is discussed in more detail below.

When the wick touches the animal's fur or skin, some of the pesticide held by the exposed portion of the wick is transferred to the animal. While shown attached to the animal's ear, the dispenser 20 could be attached to the tail, hung around the neck or otherwise attached to the animal. The dispenser should be attached, however, such that the animal's normal movement causes the pesticide to be transferred to the animal's fur or skin by mechanical contact with the wick, much like a pen deposits ink on a page upon contact. Once the liquid pesticide is deposited onto the animal, it is further spread by virtue of the animal's normal movement and through contact with other animals. As the animal moves its head from side to side and rubs along other animals through social contact, it has been found that the liquid pesticide is spread along the entire length of the animal.

As the animal's movement continues and pesticide is dispensed from wick 50, wick 50 in turn continues to draw pesticide from reservoir 28 because, as noted above, the wick has a greater capillary attraction than the reservoir. Advantageously, the wick continues to draw pesticide from the reservoir and dispenses the pesticide until the dispenser is essentially emptied of pesticide and provides a substantially constant level of output until the dispenser is almost empty. In other words, the rate of dispensing is substantially independent of the amount of fluid contained in the reservoir until the reservoir is close to being empty. Thus, the problems with saturated polymer tags in which the pesticide quickly drops off to a sub-lethal dose are avoided. In conditions of normal use, the dispenser can be used for 120 days or much longer before the pesticide is depleted. As discussed below, test results show that dispensing periods far exceeding 180 days can be achieved, in which the average amount dispensed per day can be controlled. This is significantly longer than known polymer tags that are saturated with pesticides. The amount of substance dispensed per contact can be adjusted, e.g., by adjusting the diameter of the wick. In certain exemplary embodiments, the end of the wick 50' shown in FIG. 1B terminates at a position that is substantially flush with the opening. In other embodiments, the end of the wick may be slightly recessed from the opening, but still provide sufficient contact with the fur of the animal to obtain an optimum dispense rate. If the wick protrudes only slightly or does not protrude from the opening, the possibility of it becoming caught on or making excess contact with the animal's fur is reduced. The possibility of the wick fraying is also reduced, as discussed below.

As noted above, wick 50 must have a greater capillary attraction than the reservoir. It should be understood that for purposes of this application, "capillary attraction" means the tendency of a material to draw liquid therein. The higher the "capillary attraction," the greater this tendency. Those of skill in the art also refer to this tendency as "wicking," "wicking ability," "capillary action," "capillary pull," "wicking strength" and the like. Felt has excellent, predictable, and consistent wicking capabilities, and various types of felt can be used for both the wick and reservoir. Fibrous bundles are also excellent choices for wick 50 and reservoir 28. For example, one commercial material suitable for wick 50 is bonded polyolefin fiber bundle with a density of 0.27 g/cc (supplied by Filtrona Fibertec, 1625 Ashton Park Drive, Colonial Heights, Va., 23834) Filtrona sample no. 05-052. One commercial material suitable for reservoir 28 is bonded polyolefin fiber bundle with a density of 0.122 g/cc (supplied by Filtrona Fibertec, 1625 Ashton Park Drive, Colonial Heights, Va., 23834) Filtrona sample no. 03-368A. One of skill in the art would readily recognize, however, that many other materials can be used for the wick and the reservoir, such as cotton, polyester, fibers (including glass fibers), nylon, polypropylene and many others. The materials should be chosen such that the wick has a greater capillary action or wicking strength than the reservoir, and such that the fur of the animal draws fluid from the wick by capillary action upon contact.

The selection of materials for the wick and reservoir may depend upon the substance being dispensed, e.g., its viscosity, volatility, hydrophilicity, surface tension and other fluid properties. Liquids dispensed with dispenser 20 are typically substantially nonvolatile so that they do not evaporate from wick 50, but instead are only transferred from wick 50 upon contact. Generally speaking, if felt or a fibrous bundle is used for reservoir 28 and wick 50, the capillary action or wicking ability increases with increasing density of the substance. However, the wicking properties of wick 50 and reservoir 28 can vary with the type of substance being dispensed. The exemplary wick and reservoir material identified in the previous paragraph were tested and performed satisfactorily when the substance being dispensed was spinosad formulation M08-AH00277-7-1 (lot X-51908) Elanco Animal Health, 2001 West Main Street, Greenfield, Ind. 46140, as detailed in the examples below.

Figure 4:
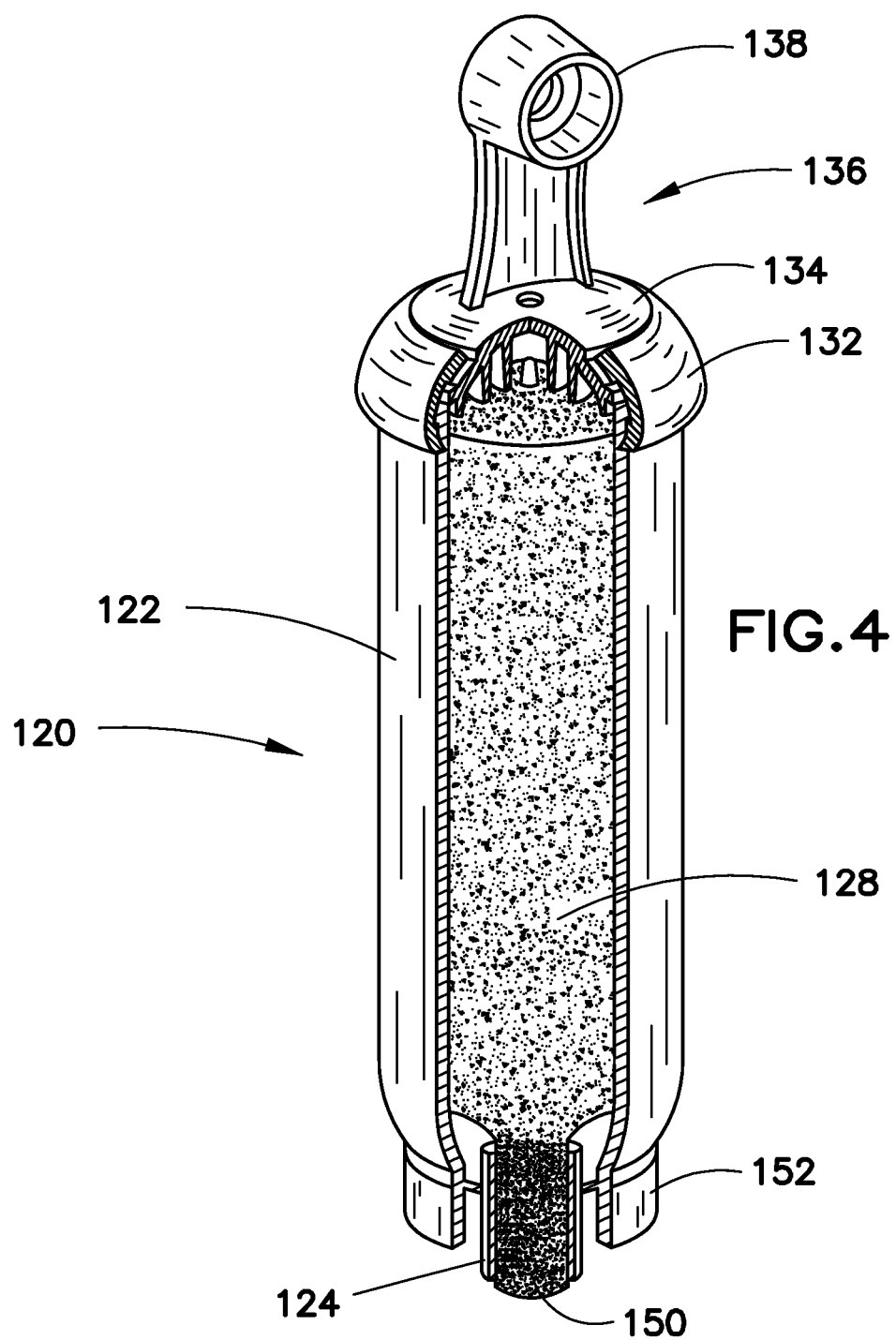
FIG. 4 is a perspective view of an alternate embodiment of a dispenser in accordance with the present invention with parts of the dispenser broken away to expose the interior thereof.

With reference to FIG. 4, an alternate embodiment of a dispenser 120 is shown in which reservoir 128 and wick 150 are formed from a unitary material. As shown, wick 150 is compressed and "squeezed" by sleeve 124. That is, sleeve 124 exerts a compressive force on wick 150. The compression of wick 150 increases its density and thus increases the number of pores per unit volume. This in turn tends to increase its wicking strength or capillary attraction. In certain circumstances, it may be advantageous to manufacture the reservoir and wick from a single piece of material, and the dispenser shown in FIG. 4 is an example of how that can be accomplished.

Figure 5:
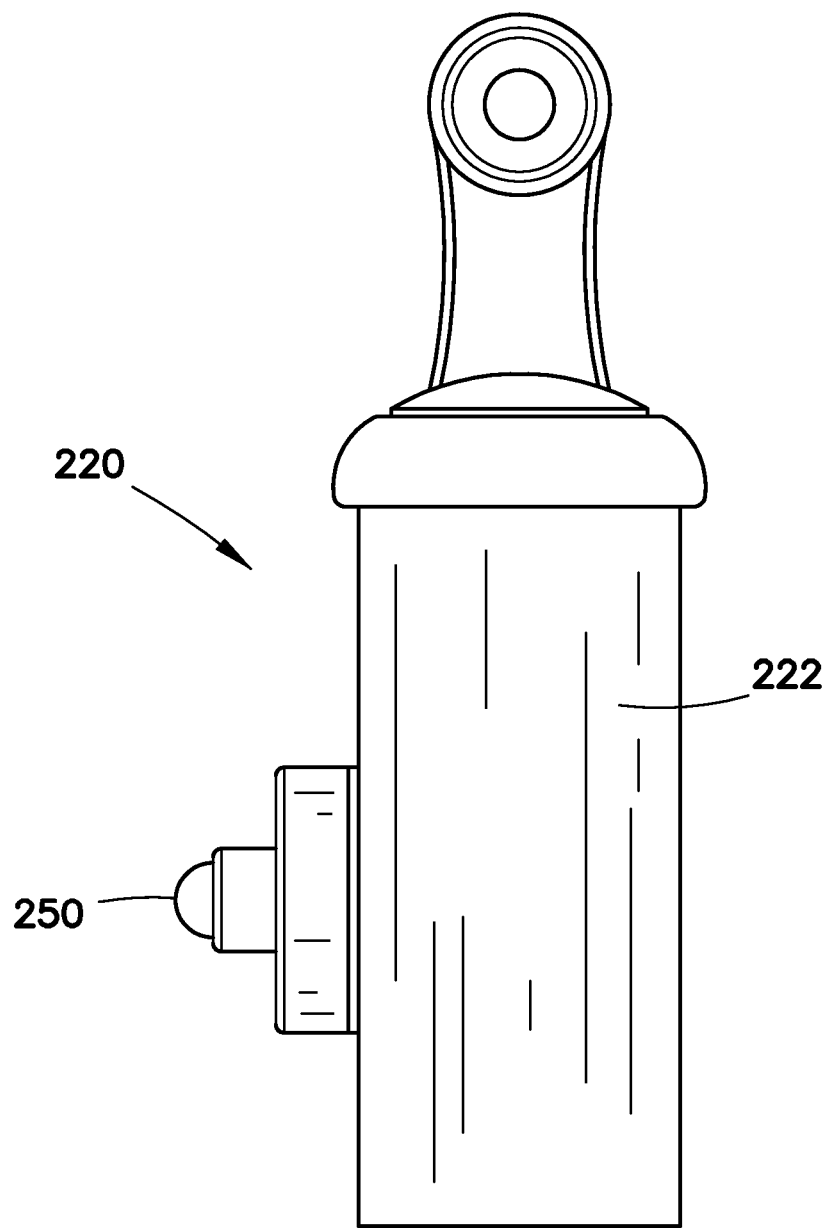
FIG. 5 is a side view of an alternate embodiment of a dispenser in accordance with the present invention.

Furthermore, it should be appreciated that because the disclosed embodiments work by capillary action, the wick need not be placed at the bottom of the dispenser and the dispenser need not be attached to the animal such that the wick is pointing downward. With reference to FIG. 5, dispenser 220 includes a wick 250 that extends laterally from the side of shell 222. The capillary forces that drive fluid flow in the illustrated embodiments can work against gravity, if so desired. However, in the embodiment illustrated in FIG. 1, skirt 52 partially surrounds or circumscribes the sleeve 24 and wick 50, which tends to prevent rain water from contacting wick 50, either directly or dripping from shell 22. If excessive rain water were to fall upon wick 50 or drip onto it from the sides of the dispenser, such could dilute the strength of the pesticide that is contained in the dispenser or otherwise undesirably alter the wicking properties of the device.

Since the dispenser disclosed herein delivers fluid by wicking, as opposed to gravity or pressure differentials, a wide variety of pesticides can be used. These include but are not limited to various avermectins, benzimidazoles, milbemycins, carbamates, organophosphates, phenylpyrazoles, amidines, insect growth regulators, juvenile hormones, nicotinoids, pyrroles, pyrethrins, pyrethroids and naturalytes (i.e. the spinosyn family). Representative compounds may include abamectin, doramectin, eprinomectin, selamectin, alphamethrin, amitraz, coumaphos, ivermectin, deltamethrin, cyhalothrin, diazinon, cyromazine, cypermethrin, milbemycin, cyfluthrin, cyloprothrin, famphur, fenthion, fenvalerate, flucythrinate, flumethrin, hexaflumuron, lindane, lufenuron, malathion, methoprene, metriphonate, moxidectin, permethrin, pyrethrin, pyrethrum, phosmet, pirimiphos, chlorvinphos, rotenone, propetamphos, tetrachlorvinphos, zeta-cypermethrin, coumaphos and spinosad, among others.

Figure 6:
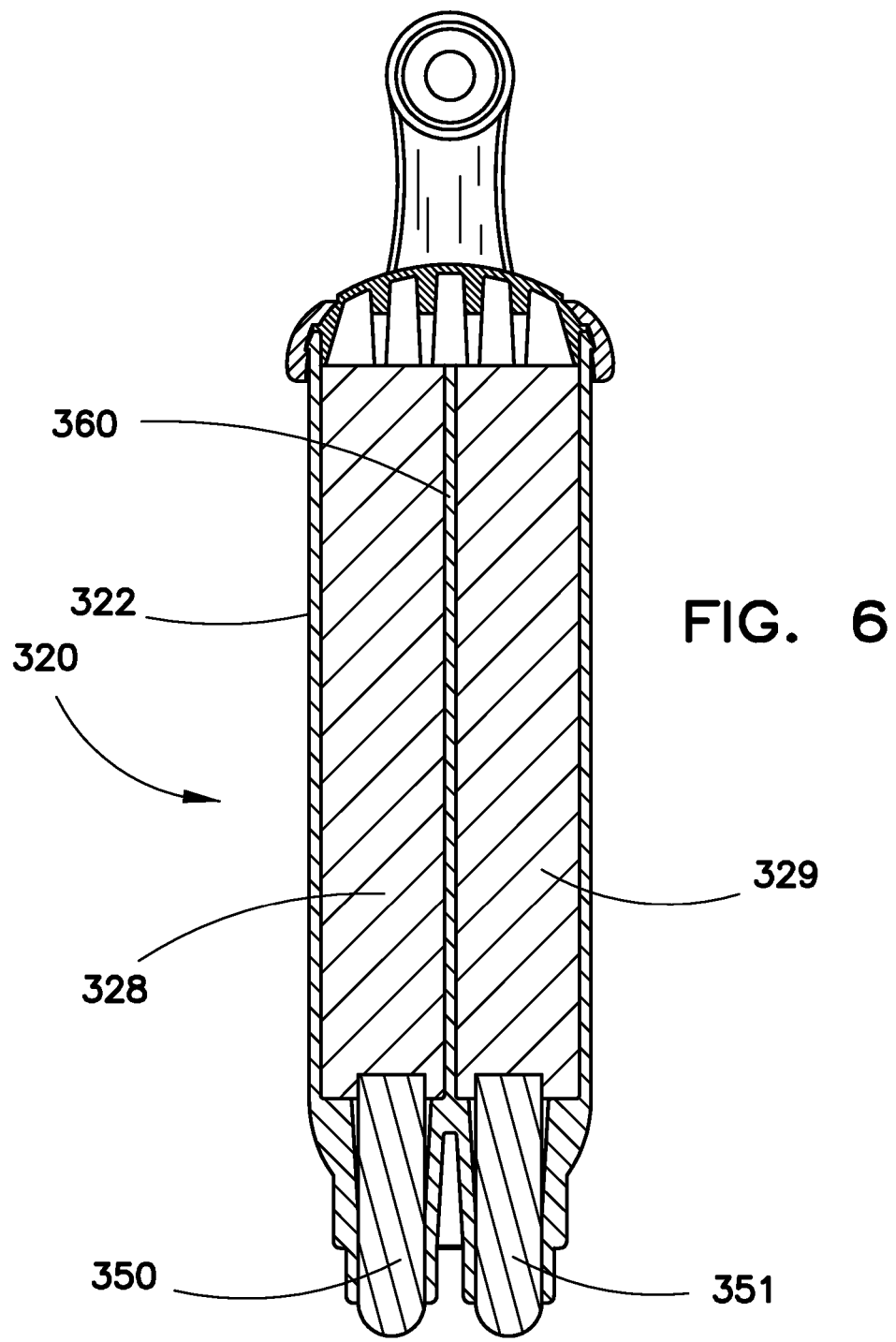
FIG. 6 is a sectional view of an alternate embodiment of a dispenser in accordance with the present invention.
Figure 7:
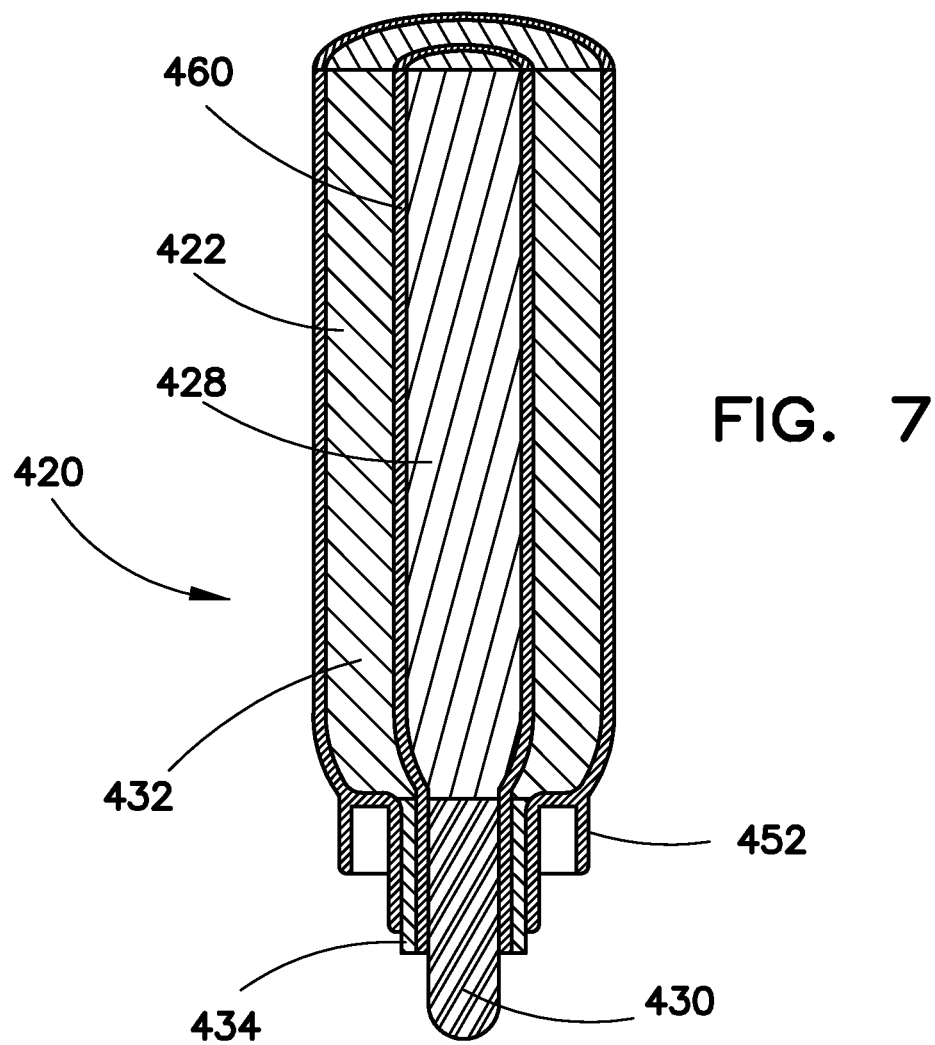
FIG. 7 is a sectional view of another alternate embodiment of a dispenser in accordance with the present invention.

FIGS. 6 and 7 illustrate embodiments in which multiple substances can be dispensed. Exemplary substances capable of being dispensed together in accordance with the present invention include, but are not limited to, lambdacyhalothrin, gamma-cyhalothrin and imidacloprid. With reference to FIG. 6, dispenser 320 includes reservoir 328 in fluid communication with wick 350 to dispense a first substance by capillary action. Similarly, reservoir 329 is in fluid communication with wick 351 to dispense a second substance by capillary action. Shell 322 includes a divider 360 that maintains reservoir 328 separate from reservoir 329. In FIG. 7, dispenser 420 includes centrally disposed reservoir 428 in fluid communication with wick 430 and annular reservoir 432 in fluid communication with wick 434. Dispenser 420 includes an outer shell 422, similar to shell 22 described with reference to FIG. 1, and an inner shell 460 that separates the two reservoirs. As shown in FIG. 7, both wicks have surfaces thereof exposed for contact with the animal to which dispenser 420 is attached. A skirt 452 may prevent rain water from reaching wicks 430 and 434.

EXAMPLES

Specific examples embodying the technology described above are set forth below.

Example 1

Objective: In this example two prototype devices similar in structure to device 20 described above were tested to determine the fluid payout difference between a dispenser that had repeated mechanical contact compared to an identical dispenser left in a static position.

Prototype Description: The dispensers used in this example were fabricated from a plastic shell and insert materials used in a marker manufactured by Sanford Corp. under the Accent® brand. The reservoir was made of Formax 609, Acetal Copolymer from Chem Polymer Corporation and a wick formed from bonded polyolefin fiber bundle with a density of 0.27 g/cc (supplied by Filtrona Fibertec, 1625 Ashton Park Drive, Colonial Heights, Va., 23834) Filtrona sample no. 05-052. The devices were filled with approximately 8 cc of spinosad formulation M08-AH00277-7-1 (lot X-51908) and weight was recorded.

An attachment means similar to attachment means 36 was grafted to the top of the dispenser shell that was used for the repeated mechanical contact, and this dispenser was attached to a mechanical cow ear having faux fur. The other dispenser (which was maintained stationary) had no attachment means, only a plug to seal it at the top, which explains the discrepancy in weights between the two dispensers.

Test Apparatus:
  Ohaus Explorer Pro analytical balance
  Mechanical cow ear (custom manufactured by Aircom Mfg., Inc.)

Observation Method:

One device was attached to the mechanical cow ear and allowed to run at an approximate rate of one cycle per 7 seconds. Each cycle consists of the ear flicking backward and making momentary contact with the faux fur. The other device was placed in a vertical and stationary position and left undisturbed with the exception of weight recording. The devices were weighed at regular intervals and weights were recorded.

Observations:

After one hour of cycling, there was visible evidence of the spinosad formulation on the faux fur. The odor of the formulation could also be detected on the faux fur. The devices were checked again at 24 hours. Results are recorded in Table 1, below.

After the 24 hour check the test was re-started. The weight of the devices were checked hourly for five hours. The fur was changed to a clean patch at each hour in an attempt to obtain a more consistent payout. The results presented in Table 1 show that the device that repeatedly contacted the faux fur dispensed at an hourly rate of approximately 55 times greater than the dispenser that was held stationary.

TABLE 1

| Weight Loss Results | | |
|---|---|---|
| | Moving device (grams) | Static device (grams) |
| Start weight | 16.97 | 13.36 |
| Weight @ 3.5 hrs | 16.891 | 13.358 |
| 3.5 hr loss | 0.079 | 0.002 |
| Weight @ 24 hrs | 16.712 | 13.341 |
| 24 hr loss | 0.258 | 0.019 |
| Start weight | 16.712 | 13.331 |
| Weight @ 1 hr | 16.704 | 13.331 |
| 1 hr loss | 0.008 | 0 |
| Weight @ 2 hrs | 16.693 | 13.331 |
| 2 hr loss | 0.019 | 0 |
| Weight @ 3 hrs | 16.685 | 13.331 |
| 3 hr loss | 0.027 | 0 |
| Weight @ 4 hrs | 16.676 | 13.33 |
| 4 hr loss | 0.036 | 0.001 |
| Weight @ 5 hrs | 16.657 | 13.33 |
| 5 hr loss | 0.055 | 0.001 |
| Average loss/hr | 0.011 | 0.0002 |

Example 2

The objective of this test was to determine if the dispenser payout rate can be altered by changing the amount of surface area of the wick exposed at the tip of the device, i.e., whether the rate can be altered by increasing the amount by which the wick protrudes from the opening.

Prototype Description: A dispenser as described above with respect to Example 1 was used. The dispenser was filled with approximately 8 cc of spinosad formulation M08-AH00277-7-1 (lot X-51908) and weight was recorded.

As in Example 1, the dispenser used for the repeated mechanical contact had an attachment means, whereas the stationary device did not.

Test apparatus:

Ohaus Explorer Pro analytical balance

Aircom mechanical cow ear

Observation method:

The dispenser initially had its wick protruding about ¼ of an inch from the opening of the dispenser. It was attached to the mechanical cow ear and allowed to run at an approximate rate of one cycle per 7 seconds. Each cycle consists of the ear flicking backward and making momentary contact with the faux fur. The device was allowed to cycle for two hours. Weight was recorded at each hour. At the end of the two hours, the device was removed from the mechanical ear and approximately ½ of the protruding portion of its wick was removed. Weight was recorded and the above sequence was repeated. At the end of the second two hour cycle, the device was once again removed from the mechanical ear and the wick was cut flush with the end of the device. Weight was recorded and the above sequence was repeated.

Observations:

Shortening the wick and accordingly decreasing the surface area available for contact produces a measurable effect on payout. The payout decreased by a little more than 50% when the amount of the wick protruding was reduced by about half. The dispenser then lost very little or no weight when the wick was cut off flush with the opening. It was also difficult to detect any of the liquid spinosad formulation on the faux fur, whereas the liquid spinosad could be easily seen on the samples taken with an exposed wick. Table 2, below, illustrates these results.

TABLE 2

| Weight Loss Results | | | |
|---|---|---|---|
| | Unaltered Wick (grams) | Half Cut Wick (grams) | Flush Cut Wick (grams) |
| Start weight | 16.63 | 16.558 | 16.48 |
| Weight @ 1 hr | 16.619 | 16.554 | 16.479 |
| 1 hr loss | 0.011 | 0.004 | 0.001 |
| Weight @ 2 hrs | 16.607 | 16.55 | 16.478 |
| 2 hr loss | 0.023 | 0.008 | 0.002 |
| Average loss/hr | 0.0115 | 0.004 | 0.001 |

Example 3

Test objective:

Determine whether an additional prototype will payout fluid at a rate similar to the dispenser of Example 1 under similar conditions.

Prototype description:

A prototype similar to that described in Example 1 was used. The device was filled with approximately 8 cc of spinosad formulation M08-AH00277-7-1 (lot X-51908) and weight was recorded.

Test apparatus:

Ohaus Explorer Pro analytical balance

Aircom mechanical cow ear

Observation Method:

The device was attached to the mechanical cow ear and allowed to run at an approximate rate of one cycle per 7 seconds. Each cycle consists of the ear flicking backward and making momentary contact with the faux fur. The device was weighed hourly and weights were recorded. The mechanical ear was moved to a clean patch of faux fur at each hour.

Observations:

After one hour of cycling, there was visible evidence of the spinosad formulation on the faux fur. The odor of the formulation could also be detected on the faux fur. Results are recorded in Table 3, below.

TABLE 3

Weight Loss Results

|  | Device weight (grams) Day 1 | Device weight (grams) Day 6 |
|---|---|---|
| Start weight | 16.712 | 16.473 |
| Weight @ 1 hr | 16.704 | 16.463 |
| 1 hr loss | 0.008 | 0.01 |
| Weight @ 2 hrs | 16.693 | 16.452 |
| 2 hr loss | 0.019 | 0.021 |
| Weight @ 3 hrs | 16.685 | 16.438 |
| 3 hr loss | 0.027 | 0.035 |
| Weight @ 4 hrs | 16.676 | 16.424 |
| 4 hr loss | 0.036 | 0.049 |
| Weight @ 5 hrs | 16.657 | 13.33 |
| 5 hr loss | 0.055 | 0.067 |
| Average loss/hr | 0.011 | 0.0134 |

Example 4

Test objective:

Determine if elevated temperature causes spinosad formulation to leak from the dispenser in droplet form. (Weight loss due to evaporation was not considered in this test.)

Prototype description:

The prototype was similar to that described in Example 1. The dispenser was filled with approximately 8 cc of spinosad formulation M08-AH00277-7-1 (lot X-51908) and weight was recorded.

Test apparatus:

VWR model 1410 vacuum chamber/oven

Observation method:

The dispenser was placed in a vertical orientation inside the oven and the oven temperature was set to 50° C. A polished stainless steel slide was placed below the device to help identify any potential dripping. The device was observed for 24 hours.

Observations:

The device was visually checked several times over the course of 24 hours. No dripping was observed. In addition, drops did not form on the end of the wick nor at the bottom of the reservoir. The dispenser appeared to retain all the liquid. At the end of the test, the dispenser was removed from the oven and tested on a piece of paper to determine if the wick had dried out. Initially, the wick felt a bit dry as it was applied to the paper. However, after minimal contact with the paper, the dispenser began to pay out liquid to the paper.

Example 5

Objective: In this example, prototype devices similar in structure to device 20 described above were tested to verify with live animals under actual conditions that the amount of liquid payout per day can be controlled and can be prevented from dropping off before the end of the desired dispensing period. These tests were also done to determine the difference in fluid payout as a function of viscosity. Additionally, this example disproves the conventional wisdom for the upper limit to the weight of a pesticide dispenser that is attached to cattle.

Prototype Description: The dispensers used in this example were fabricated the same as described above with reference to Example 1. The wick was provided substantially flush with the opening, as depicted in FIG. 1B. The devices were filled with spinosad formulation Oleic/IPM or Oleic/Aromatic and weight was recorded. The amount of liquid added to the dispensers ranged from about 12.5 g to about 18.5 g for these tests. The total weight of the dispensers varied from about 22 g to 35 g. The formulation Oleic/IPM that produced the liquid having a viscosity of 60 cps in Tables 4 and 5 included the following constituents and percentages:

| Material | Wt % |
|---|---|
| Spinosad @ 90.2% purity | 16.7 |
| Isopropyl myristate (IPM) | 23.1 |
| Oleic Acid | 60.0 |
| Preservative | 0.2 |

The formulation Oleic/Aromatic 200 IPM that produced the liquid having a viscosity of 20 cps in Table 4 included the following constituents and percentages:

| Material | Wt % |
|---|---|
| Spinosad @ 90.2% purity | 16.7 |
| Aromatic 200 | 25.0 |
| IPM | 23.0 |
| Oleic Acid | 35.1 |
| Preservative | 0.2 |

The formulation Oleic/Aromatic 200 IPM that produced the liquid having a viscosity of 8 cps in Table 5 included the following constituents and percentages:

| Material | Wt % |
|---|---|
| Spinosad @ 90.2% purity | 16.2 |
| Aromatic 200 | 10.2 |
| IPM | 50.0 |
| Oleic Acid | 22.9 |
| Preservative | 0.2 |

An attachment means similar to attachment means 36 as depicted in FIG. 1 was grafted to the top of the dispenser shells, and these dispensers were attached to live cattle. The cattle were allowed to graze normally on pasture. Herds that were used to determine payout were kept separate from herds used to determine effectiveness of the devices, but were within a few miles of each other. The tests were conducted in various parts of southern Texas as well as in Australia in the Queensland area. To determine payout per day, the dispensers were removed every two weeks, surface wiped, weighed, and then reattached by the same initial placement method back into the ears of the cattle. Weight loss over the two week period was then calculated and normalized to determine daily payout.

Observations:

Cattle with the devices in the payout group had a marked visible reduction in horn flies. Further, to complete study no. 1 (Table 4), dispensers having an initial total weight of about 33.8 g were attached to about 200 cattle, and there were no visible signs in any of the cattle of any disease, abscesses, tearing, ripping of the ear or migration of the devices in the ear tissue as a result of the devices being installed in and hanging from the ears of the cattle. That is, when these dispensers were attached to the ears of the cattle once at the beginning of the "fly season" (as would be the normal practice for use of a dispenser such as disclosed herein), there were no adverse effects observed on the ears.

This is quite surprising and goes directly against the conventional wisdom. Indeed, the conventional wisdom with which the inventors have been faced since creating their invention has been that the upper weight limit for a pesticide dispenser is around 15 grams. Under the conventional wisdom, a dispensing device heavier than that just mentioned that is attached to a cow's ear would cause irritation of the ear and head of the cow and would not stay attached. Notwithstanding this conventional wisdom, the inventors have found that dispensers weighing 33-34 g initially could be attached to cattle for over 100 days without any adverse effects.

Without wishing to be tied to any specific theory, it is speculated that the apparent comfort provided to the cattle wearing the inventive dispensers is due, at least in part, to the compact shape of the dispensers made in accordance with these teachings, as opposed to the large and ungainly "tags" of the prior art. The weight of a smaller, more compact, dispenser can apparently be more easily borne by the animal. A small dispenser that has an elongate shape with its wick exposed at the bottom of the device when hanging from a cow's ear seems particularly advantageous.

In this connection, and quite advantageously, the dispensers in accordance with these teachings require that only a small portion of their wicks are exposed for contact with the animals to transfer a lethal and sustained dose of the pesticide to the animals over an extended period. Indeed, as discussed elsewhere, it is desirable in certain circumstances to maintain the end of the wick flush with the opening or even have it recessed slightly from the opening. In one exemplary design in which the wick is substantially flush with the opening, the dispenser 20 has an overall surface area of 13.7 in$^2$, whereas the surface area of the exposed portion of the wick is about 0.7 in$^2$. In this embodiment, the exposed portion of the wick comprises about ½% of the entire surface area of the device. In general, with embodiments that utilize a fibrous bundle wick, it is preferred that the portion of the wick exposed for fluid transfer comprise less than about 5%, preferably less than about 2%, and more preferably less than about 1% of the surface area of the entire device.

As noted above, having only a small portion of the wick exposed provides advantages in terms of avoiding contamination when handling the devices as well as providing greater predictability in payout rate. In this connection, depending upon the type of material that is chosen for the wick, e.g., a fibrous bundle, it may be desirable to maintain the exposed end of the wick substantially flush with (see FIG. 1B) or slightly recessed within sleeve 24. Advantageously, in this arrangement, the sleeve protects the wick and prevents it from fraying, and thus increases the predictability of the payout. More specifically, the sleeve 24 (See FIG. 1B) presses against the sides of the wick and holds it in place and protects it against unwanted contact that would cause it to fray, which thereby allows the wick to maintain substantially the same shape and size for the entire period over which it is used. By contrast, if the wick were permitted to fray, the amount of fluid payout would significantly increase, thereby depleting the reservoir too soon, and payout would also become unpredictable. Thus, maintaining the shape of the wick provides greater consistency in payout. Instead of maintaining the wick substantially flush with or recessed in the opening, one of skill in the art would recognize that by choosing a material for the wick that maintains its shape when exposed, the wick may be permitted to protrude from the opening, yet the device would still provide a predictable and consistent payout.

The results in Tables 4 and 5 clearly show that viscosity affects payout rate. While not wishing to be tied to any specific theory, it is believed that the densities and material composition of the fibrous reservoir and wick are the primary drivers for preventing gravitational flow out of the device, as well as providing a consistent payout over the entire period in which the devices are attached to the animals. As such, viscosity was not expected to play a significant role in payout, as compared to either systems that had a uniform fibrous bundle or no fiber bundle at all. Quite surprisingly, however, the results presented in Tables 4 and 5, below, show that the viscosity of the formulations placed into the device has a significant impact on payout rate, even at higher temperatures.

TABLE 4

| Formulation[3] | Viscosity (cps) | Study # (Inventor Ref. #) | Depletion (mg/day) | | | | |
|---|---|---|---|---|---|---|---|
| | | | 0-14 Days | 14-28 | 28-56 | 56-70 | 70-105 |
| Oleic/IPM | 60 | 1[1] (T9CAL0611) | 100 | 50 | 130 | 70 | ongoing |
| | | 2[2] (T9C480513) | 51 | 62 | 48 | 47 | 45 |
| | | 3 (T9C480614) | 58 | 73 | 116 | 101 | 74 |
| Oleic/Aromatic 200 IPM | 20 | 4 (T9C480614) | 146 | 124 | 95 | 49 | 44 |

[1]Ongoing study at the time of writing with an intended duration of 150 days.
[2]Devices fitted with a smaller diameter tip than used in later studies.
[3]All formulations contain approximately 15% spinosad.

TABLE 5

| Formulation | Viscosity (cps) | Study # (Inventor Ref. #) | Depletion (mg/day)[4] | | | | |
|---|---|---|---|---|---|---|---|
| | | | 0-14 Days | 14-28 | 28-56 | 56-70 | 70-91 |
| Oleic/IPM | 60 | 5 (T9C480536) | 30 | 30 | 40 | 50 | 60 |
| Aromatic200/ IPM/Oleic | 8 | 6 (T9C480536) | 130 | 100 | 90 | 90 | 60 |

[4]The study presented was conducted during the winter months in Texas, which resulted in lower depletion rates. However, the effect of viscosity on depletion curve characteristics is still clear.

In the studies described, formulas with certain solvent variations produced a range of viscosities from 8 to 60 cps at 20° C. In the summer conditions in Texas, as well as tests that are ongoing in Australia at the time of this writing, only the higher viscosity formulations gave payout rates which consistently approached or met the targeted payout amount of 100 mg/day. Furthermore, with the higher viscosity formulations, it can be seen that the average payout dose per day, i.e., the average amount of liquid that is transferred to the animal per day, does not substantially decrease over the entire time period in which the device is attached to the animal. As noted elsewhere, the prior art tags exhibit a precipitous drop off in payout rate to a sub-lethal dose within only a few weeks, if not days, of when they are first attached. Also, the test results shown in entry no. 1 of Table 4 are ongoing. Nonetheless, after being attached to cattle for 70 days, it was shown that the devices only lost about one-third of their initial liquid volume. In view of the substantial amount of liquid remaining, one of skill in the art would anticipate that the payout rate could be sustained for 180 days or substantially longer if desired. In many applications, e.g., the control of horn flies that are bothersome to cattle, the desired duration is about 140 days.

Varying the viscosity can be accomplished by, e.g., choice of solvents and loading of active ingredients, or by modifying existing solutions by addition of known rheological or viscosity-building materials, such as bentone and other clays, silicas/silicates, trihydroxystearin, polymeric comb surfactants, polymeric surfactants, natural and synthetic gums, water and organic soluble polymers including latexes. Gels can even be formed and used in the system if their properties are such that shear forces can thin them enough to deliver material on a consistent basis. One of skill in the art would recognize various other means for adjusting the viscosities.

In view of these surprising test results, an exemplary viscosity for the liquid used in a dispenser in accordance with these teachings is from about 5 to about 100 centipoise (cps), more preferably from about 20 to about 100 cps, more preferably from about 40 to about 80 cps, and most preferably about 60 cps. One of skill in the art would also recognize that other factors, such as temperature at which the dispensers are to be used, available surface area of the exposed wick etc., may affect the desired viscosity.

Another aspect in this system is vapor pressure. Formulas are preferred that are substantially nonvolatile, i.e., have low vapor pressures, e.g., less than about $1 \times 10^{-6}$ mm Hg. This is because dispensers in accordance with these teachings are vented. Volatile solvents would create potential solubility problems for the formula as well as change the payout profile as they escaped into the atmosphere, likely depleting the reservoir long before the desired length of time the dispensers are worn by the animals.

One of skill in the art would readily recognize that these teachings provide a method of dispensing a target amount of liquid per day onto an animal and also provide the ability to predictably control the amount of liquid that is dispensed over the entire period during which the dispenser is to be used. In this inventive method, the target amount of liquid that is to be transferred to the animal per day is first established. More precisely, a daily amount of active chemical, e.g., a pesticide, that is needed to provide a lethal dose to the insects is established. The carrier liquid for the active ingredient and the concentration of active ingredient must also be chosen, which is typically done as a function of obtaining fluid parameters such as viscosity and volatility that are suitable for dispensing a predictable, controlled amount of liquid per day.

For example, as shown above in study 2 of Table 4, a viscosity of about 60 cps and a smaller tip (wick) diameter produced a sustained dose of about 50 mg/day over the entire period. Thus, the viscosity, amount of wick to be exposed, the total amount of liquid needed in the reservoir, the size of the reservoir and wick, etc., must all be determined as a function of dispensing the target amount per day over the entire period of interest. Once these parameters are determined and the duration of the period in which the liquid to be dispensed is established, a dispenser such as dispenser 20 can be assembled accordingly. The wick is then intermittently contacted with the animal, during which time the wick gradually draws the liquid from the reservoir and deposits it on the animal. This can be accomplished, e.g., by attaching the dispenser to the ear of the animal and allowing the animal to go about its normal activities. During the animal's movement, the exposed wick will intermittently contact the animal as described above and will dispense liquid to the animal.

By properly selecting the parameters just described, and by maintaining the shape and size of the exposed portion of the wick substantially the same over the duration of dispensing, the average daily amount of liquid transferred to the animal does not substantially differ from the target amount. This can be particularly appreciated for embodiments in which the liquid is a pesticide and the dispensing period (e.g., horn fly season) is 120 days or more. For the prior art tags described above, in addition to the initial payout undesirably being in many cases much higher than needed, an even bigger problem with these tags is that the payout drops to a sub-lethal dose that is well below the target amount long before the end of the 120 day period. By contrast, with dispensers in accordance with these teachings, the average amount of liquid actually transferred to the animal at any given time during the period of dispensing should differ from the target amount by less than about 25%, more preferably, less than about 20%, and most preferably, less than about 15%. These teachings thus provide a method for controlling the amount of liquid dispensed over the entire period, including the ability to prevent too much liquid payout at the onset while also preventing the amount of liquid dispensed per day from substantially decreasing over the entire period.

While a preferred embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dispenser for dispensing a liquid onto an animal, comprising:
   a shell having an opening;
   an attachment member for attaching the dispenser to an animal;
   a reservoir disposed in the shell and containing a substantially nonvolatile liquid having a viscosity in the range of from about 40 to about 80 cps, the reservoir being made from a material that retains the liquid by capillary forces; and
   a wick in fluid communication with the reservoir, the wick having a first end positioned adjacent the opening and having a greater capillary attraction than the reservoir.

2. The dispenser of claim 1, wherein the wick has a second end contacting the reservoir.

3. The dispenser of claim 1, wherein the wick has a greater density than the reservoir.

4. The dispenser of claim 1, wherein the wick and reservoir both are comprised of porous material and the wick has a smaller pore size than the reservoir.

5. The dispenser of claim 4, wherein the material composition of the wick and the reservoir is the same.

6. The dispenser of claim 1, wherein the first end of the wick protrudes from the opening.

7. The dispenser of claim 1, wherein the first end of the wick is substantially flush with the opening.

8. The dispenser of claim 1, wherein the first end of the wick is recessed from the opening.

9. The dispenser of claim 1, wherein the liquid contained in the reservoir is selected from the group consisting of medicaments, growth hormones, therapeutic agents, drugs, repellants, pheromones, pesticides, insecticides, scents, and combinations thereof.

10. The dispenser of claim 1, wherein the liquid has viscosity of about 60 cps.

11. The dispenser of claim 1, wherein the dispenser has a weight of at least about 25 g when filled.

12. A dispenser for dispensing a liquid onto an animal, comprising:
    a shell having an opening;
    an attachment member for attaching the dispenser to an animal;
    a reservoir disposed in the shell and containing a liquid to be dispensed, the liquid having a viscosity of from about 40 cps to about 80 cps; and
    a wick in fluid communication with the reservoir and having a first end positioned adjacent the opening, the wick having a greater capillary attraction than the reservoir.

13. The dispenser of claim 12, wherein the liquid is substantially nonvolatile.

14. The dispenser of claim 12, wherein the wick draws the liquid from the reservoir.

15. The dispenser of claim 14, wherein the wick has a greater material density than the reservoir.

16. The dispenser of claim 12, wherein the dispenser has a weight of from about 20 g to about 35 g when filled.

17. A method of manufacturing a dispenser for dispensing a liquid onto an animal, comprising:
    providing a shell having an opening and an attachment member connected to the shell for attaching the dispenser to the animal;
    providing a reservoir in the shell and holding a supply of the liquid therein by capillary attraction, the liquid having a viscosity of from about 40 to about 80 cps; and
    placing a wick in fluid communication with the reservoir the wick having a greater capillary attraction than the reservoir and having a first end positioned adjacent the opening.

18. The method of claim 17, wherein the liquid is a substantially nonvolatile liquid.

19. The method of claim 18, wherein the liquid is a substantially nonvolatile pesticide.

20. The method of claim 17, wherein the animal is a cow.

21. The method of claim 17, further comprising establishing a target amount of liquid to be transferred daily to the animal, wherein the target amount comprises at least about 50 mg per day.

22. The method of claim 17, further comprising establishing a target amount of liquid to be transferred daily to the animal, wherein the target amount comprises at least about 75 mg per day.

23. The method of claim 17, wherein the liquid comprises a pesticide selected from the group consisting of spinosad, lambdacyhalothrin, gamma-cyhalothrin, diazinon, coumaphos, cyfluthrin, endosulfan, metaflumazone and combinations thereof.

24. A method of dispensing a liquid onto an animal, comprising:
    obtaining a dispenser comprising:
    a shell having an opening,
    a porous material reservoir disposed in the shell and holding a supply of liquid therein by capillary attraction, wherein the liquid has a viscosity from about 40 cps to about 80 cps, and
    a wick in fluid communication with the reservoir and having a first end positioned adjacent the opening, the wick having a greater capillary attraction than the reservoir;
    attaching the dispenser to the animal; and
    allowing the exposed portion of the wick to intermittently contact the animal to deposit the liquid onto the animal.

25. The method of claim 24, wherein the liquid is a substantially nonvolatile liquid.

26. The method of claim 24, wherein allowing the exposed portion of the wick to intermittently contact the animal includes allowing contact over a period of at least 120 days.

27. The method of claim 26, wherein the average daily amount of liquid transferred to the animal over the last 14 days of the first 120 day period differs by no more than about 15% from a target amount.

28. The method of claim 26, further comprising allowing the animal to move about naturally, wherein the exposed portion of the wick intermittently contacts the animal as it moves.

29. The method of claim 24, wherein the liquid is a substantially nonvolatile pesticide.

30. The method of claim 24, wherein the animal is a cow.

31. The method of claim 26, wherein the wick substantially maintains its shape over the entire period.

32. The method of claim 26, wherein the period comprises at least 150 days.

33. The method of claim 32, wherein the period comprises at least 180 days.

34. The method of claim 24, wherein the average amount of liquid dispensed comprises at least about 50 mg per day.

35. The method of claim 24, wherein the average amount of liquid dispensed comprises at least about 75 mg per day.

36. The method of claim 24, wherein the liquid comprises a pesticide selected from the group consisting of spinosad, lambdacyhalothrin, gamma-cyhalothrin, diazinon, coumaphos, cyfluthrin, endosulfan, metaflumazone and combinations thereof.

37. The method of claim 17, wherein placing the wick comprises positioning the first end of wick substantially flush with or recessed from the opening.

38. The dispenser of claim 1, wherein the shell includes a sleeve extending therefrom and defining the opening with the wick being at least partially disposed within the sleeve, the sleeve including a plurality of nubs projecting radially inwardly within the sleeve, the nubs engageably securing the wick within the sleeve wherein the nubs define a vent space between the wick and sleeve to thereby allow the ingress of air and venting of the reservoir.

39. The dispenser of claim 12 wherein:
    the attachment member includes a post for extending through a piercing on the animal;
    the reservoir comprises a material which retains the liquid by capillary attraction, whereby the wick draws the liquid from the reservoir; and
    the liquid is substantially nonvolatile.

40. The dispenser of claim 39 wherein the wick has an exposed portion that is about 0.5% of the entire surface area of the device.

41. The dispenser of claim 40 wherein the exposed portion of the wick is about 0.7 square inches.

42. The dispenser of claim 41 wherein the liquid has a viscosity of about 60 cps.

43. The method of claim 17, wherein the liquid comprises a carrier liquid and a pesticide and the method further comprises:
  determining a desired daily amount of the pesticide which is desired to be applied to the animal;
  selecting a carrier liquid having a viscosity between about 40 cps to about 80 cps; and
  determining a concentration of the pesticide in the carrier liquid wherein the concentration is a function of the desired daily amount and the viscosity of the carrier liquid.

44. The method of claim 43 wherein selecting a carrier liquid includes selecting a carrier liquid having a viscosity of about 60 cps.

45. The method of claim 43, wherein the desired daily amount is at least about 50 mg per day.

46. The method of claim 24, wherein attaching the dispenser to the animal comprises attaching the shell to an ear of the animal by inserting a post through a piercing on the ear of the animal.

47. The method of claim 24, wherein the average amount of liquid deposited onto the animal per day does not substantially decrease over a period of at least 120 days.

48. The dispenser of claim 12, wherein the shell includes a sleeve including a plurality of nubs projecting radially inwardly within the sleeve and engageably securing the wick within the sleeve, wherein the nubs define a vent space between the wick and sleeve to thereby allow the ingress of air and venting of the reservoir.

49. The dispenser of claim 39, wherein the dispenser has a weight of from about 20 g to about 35 g when filled.

50. The method of claim 24, further comprising transferring daily an established target amount of liquid to the animal of at least about 50 mg per day.

51. The method of claim 24, further comprising transferring daily an established target amount of liquid to the animal of at least about 75 mg per day.

* * * * *